United States Patent Office 3,655,799
Patented Apr. 11, 1972

3,655,799
PROCESS FOR HYDROGENATING UNSATURATED ORGANIC COMPOUNDS
Christian Lassau, Paris, and Lucien Sajus, Croissy, Seine, France, assignors to Institut Francais du Petrole, des Carburants et Lubrifiants, Rueil Malmaison, Hauts-de-Seine, France
No Drawing. Filed June 26, 1970, Ser. No. 50,324
Claims priority, application France, July 2, 1969, 6922455
Int. Cl. C07c 5/00
U.S. Cl. 260—666 P     12 Claims

ABSTRACT OF THE DISCLOSURE

This invention relates to a two-step process for hydrogenating unsaturated organic compounds, the first step being conducted in homogeneous phase and the second step in heterogeneous phase.

---

This invention relates to a new process for hydrogenating unsaturated compounds.

Such reactions as the hydrogenation may be carried out either in heterogeneous phase or in homogeneous phase. The homogeneous catalysis processes provide for good elimination of the reaction heat, but they do not result in a product of high purity. Furthermore in the liquid phase processes, the reaction velocity tends to be very low at the high conversion rates which are essential for obtaining saturated hydrocarbons of high purity.

Thus the liquid phase processes can hardly be used for obtaining a large production of a high purity product, for example a purity higher than 95%, or even higher than 99.9%, without using any physical separation step; in that case, a hydrofinishing stage must be used at the end of the reaction, carried out for example in a packed column or plate column.

The heterogeneous catalysis gives a product of a purity higher than 95% or even higher than 99.9%, when the reaction is completed in a gradient reactor, which necessitates a fixed bed. On the contrary, with the fixed bed heterogeneous catalysis several problems arise in the main hydrogenation stage, for example those of heat removal and catalyst mechanical steadiness.

This invention obviates to the above defects, by providing a process for hydrogenating unsaturated compounds to high purity products with the use of an apparatus of low bulk and a high reaction velocity.

According to this process, the homogeneous catalysis is combined with the heterogeneous catalysis. This combination is advantageous when the results achieved with the homogeneous catalysis are better than those obtained with the heterogeneous catalysis. The hydrofinishing is then carried out with a fixed bed according to a heterogeneous catalysis method.

The new process for hydrogenating unsaturated compounds by means of hydrogen comprises a first step of converting from 20 to 99%, and preferably from 70 to 98%, of the hydrocarbons to be hydrogenated, in the liquid phase, in the presence of a catalyst in homogeneous phase, and then a second step of completion of the reaction in the presence of a catalyst of the fixed bed type, in heterogeneous phase. During this second step, the feed may be either in the liquid phase or in the gaseous phase.

This process may be used, for example, for hydrogenating olefinic hydrocarbons.

The following compounds are examples of compounds to which the invention applies: the mono-, di- and tri-olefins containing up to 20 carbon atoms per molecule, for example ethylene, allene, cyclopentene, cyclododecatrienes, 1,3,5-undecatriene, 1,5-cyclooctadiene, as well as the polymers of mono- or di-olefins, for example polyisoprene, polybutadiene and the styrenebutadiene copolymers.

The first step may be carried out in one or more stages.

For instance, from 60 to 100% of the hydrogen may be consumed. It may be pure or admixed with other gases such as, for example, $CH_4$, $CO$, $N_2$, provided they are not detrimental to the catalysts.

The compounds to be hydrogenated may be diluted with suitable solvents such as saturated hydrocarbons, either cyclic or not, for example cycloheptane, cyclohexane, cyclopentane, decahydronaphthalene or tetrahydronaphthalene, ethers, for example tetrahydrofuran, ethylene glycol diethyl ether or ethylene glycol dimethyl ether. A heavy solvent is preferred when the compound to be hydrogenated and the hydrogenated product are sufficiently volatile to separate from the solvent by vaporization; in that case, the homogeneous catalyst remains in the vessel in which the first step takes place.

Thus, for example, cyclododecane may be obtained by hydrogenating cyclododecatriene. A high purity product could be obtained either by conventional heterogeneous catalysis with a fixed or moving bed, or by homogeneous catalysis. The latter may be competitive with the heterogeneous catalysis for the entire conversion process, when the used catalysts are those described in the French patent application No. 165,254, Sept. 5, 1968 (corresponding to the published Dutch patent application No. 69/1,356) or in the patents of addition thereto. However for producing cyclododecane of high purity, the homogeneous catalysis step may be followed with a finishing step in a column of large volume (about 10 cubic meters, for producing 1 ton per hour) which cannot be built easily.

This problem of establishing a concentration gradient in the finishing step may be solved by the use of the fixed bed heterogeneous catalysis; however this technique cannot be used easily for the main hydrogenation step since many problems are still to be solved, for example: heat removal, mechanical stability of the catalyst. The following table, which relates to the manufacture of cyclododecane of high purity, gives the size of the apparatus which must be used for producing 1 metric ton of cyclododecane per hour:

|  | Homogeneous catalysis | Heterogeneous catalysis | Mixed catalysis |
|---|---|---|---|
| 1st reactor... | 5 cubic meters for a 95% conversion. | 10 cubic meters for a 100% conversion. | 5 cubic meters for a 95% conversion. |
| 2d reactor... | 30 cubic meters for additional conversion up to 100%. |  | 1 cubic meter for additional conversion up to 100%. |

This table shows that the mixed catalysis, according to this invention, whereby a major part of the conversion is obtained by homogeneous catalysis ($\geqslant 95\%$) and a fixed bed catalysis is used for the finishing step, requires a smaller apparatus. Moreover, the technological problems are much more simple than with the use of a 100% heterogeneous technique. Finally there is obtained a product of high purity.

Irrespective of the material to be hydrogenated, the finishing reactor may comprise two beds: an upper bed of an adsorbent such as silica or alumina, which will adsorb the catalyst of the first homogeneous step, and a lower bed of the heterogeneous catalyst, the liquid phase flowing downwardly. Thus the homogeneous catalyst, which has been retained by the adsorbent, may progressively relay the second bed catalyst. Thus the latter should be considered as a starting catalyst charge.

This results in a product of high purity, for example, bromine number lower than 0.08.

A preferred catalyst for the first step has been described in the above mentioned French patent application No. 165,254.

This catalyst is obtained by contacting a transition metal compound, for example a cobalt, titanium, chromium or iron compound, with an aluminum compound having one of the formulae:

$$AlH_nX_{3-n}$$

or $$Me(AlH_mX'_{4-m})_p$$

wherein $n$ is 1 or 2, $m$ is 1, 2 or 3, $M_e$ is a monovalent or divalent metal pertaining to Group IA or IIA, $p$ is the valence of Me, and the X groups, when taken separately, are OR, $NR_2$, NHR or SR groups, or, when taken by two, are —A—Z—B— groups in which A and B are alkylene groups and Z is an alkylene group, an oxygen atom, a sulfur atom, an NH or N-hydrocarbyl group, or a polyvalent metal, and the X' groups, when taken separately, are R, OR, $NR_2$, NHR or SR groups, or, when taken by two, form —A—Z—B— groups as hereabove defined.

The molar ratio of the transition metal compound to the aluminum compound is preferably in the range of 1/1 to 1/20. The amount of transition metal compound is usually at least 0.0001 gram-mol. (preferably 0.001 to 0.1 gram-mol.) per 100 gram-mol. of the material to be hydrogenated. The catalyst may also contain electron-donors such as ethers, for example cyclic ethers, amines, for example tertiary aromatic amines, N-heterocycles, phosphine oxides and certain phosphines, for example tricyclohexyl phosphine.

The second step catalyst may consist, for example, of at least one metal of the VIII group, for example nickel, palladium or platinum; these metals may be admixed with a conventional carrier such as alumina, silica, kieselguhr, pumice, asbestos, clays, magnesia or silica-alumina.

The temperature and pressure conditions are those usually employed with the above catalysts, for example —20 to 300° C. and perferably 0 to 200° C. for the second step. The pressures may range from 0.1 to 200 atmospheres and preferably from 1 to 100 atmospheres.

The following examples are given for illustrative purposes.

EXAMPLE 1

This example relates to the hydrogenation of 150 ml. of cyclododecatriene to cyclododecane.

In the first step in homogeneous phase, the catalyst consists of 0.3 millimol. of $LiAlH(OR)_3$ in which R is tert-butyl, said catalyst being dissolved in 1 ccm. of tetrahydrofuran also containing 0.05 millimol. of cobalt naphthenate. A conversion rate of 98% is obtained by using two reactors at stationary concentration connected in series and working at 180° C. and 40 atmospheres. The conversion rate is 78% in the first one. This conversion rate is increased up to 98% in the second reactor. The effluent therefrom is passed through a reactor containing a nickel on silica catalyst at 160° C. and 40 atmospheres. Cyclododecane is obtained with a yield of about 100%; its bromine number is 0.08.

EXAMPLE 2

Example 1 is repeated, except that the effluent from the first step is passed through an alumina bed before being passed through the reactor containing nickel on silica. The bromine number of cyclododecane is 0.05.

EXAMPLE 3

Example 2 is repeated except that the second step catalyst is platinum on silica. The same results are obtained.

EXAMPLE 4

Example 2 is repeated except that $LiAlH(OR)_3$ is substituted with $NaAlH(OR)_3$ in which R is tert-butyl. The results are unchanged.

EXAMPLES 5 AND 6

Cyclopentadiene is hydrogenated to cyclopentane by the process of Example 1. The first step of homogeneous catalysis is conducted at 40° C. and 30 atmospheres. In Example 5, the reducing agent is $AlH(O\text{-tert.Bu})_2$, the molar ratio of the cobalt salt to the reducing agent being 1/2, and, in Example 6, the reducing agent is $LiAlH(O\text{-tert.Bu})_3$, the molar ratio of the cobalt salt to the reducing agent being 1/2, and, in Example 6, the reducing agent is $LiAlH(O\text{-tert.Bu})_3$, the molar ratio of the cobalt salt to the reducing agent being 1/4. The resulting cyclopentane has a bromine number of practically zero.

EXAMPLES 7 AND 8

Examples 5 and 6 are repeated, except that cyclopentadiene is diluted with ethylene glycol dimethyl ether. The results are substantially the same, except that the catalyst remains in the first step reactor.

EXAMPLE 9

Example 2 is repeated with cyclooctadiene.
Cyclooctane is obtained with a practically 100% yield. The bromine number of the product is 0.05.

What is claimed is:

1. A process comprising:
   (a) in a first step, reacting hydrogen with a liquid olefinic hydrocarbon in contact with a homogeneous hydrogenation catalyst, said reaction being conducted to the extent of a conversion of 20 to 99%; and
   (b) in a second step, reacting resultant product from step (a) with hydrogen in contact with a fixed bed heterogeneous hydrogen catalyst to complete the conversion.

2. The process of claim 1 wherein the first step catalyst is obtained by reacting a transition metal compound with an aluminum compound corresponding to the formula $$AlH_nX_{3-n}$$

or $$Me(AlH_mX'_{4-m})_p$$

in which $n$ is 1 or 2, $m$ is 1, 2 or 3, $M_e$ is a monovalent or divalent metal from one of groups IA and IIA, $p$ is the valence of $M_e$ and the X groups, when taken separately, are selected from the OR, $NR_2$, NHR and SR groups, and, when taken by two, are —A—Z—B— groups in which A and B are alkylene groups and Z is selected from an alkylene group, an oxygen atom, a sulfur atom, an NH or N-hydrocarbyl group and a polyvalent metal, and the X' groups, when taken separately, are selected from R, OR, $NR_2$, NHR and SR groups, and, when taken by two, are —A—Z—B— groups such as hereinabove defined.

3. The process of claim 2, wherein the second step catalyst contains at least one metal from group VIII.

4. The process of claim 3, wherein the metal from group VIII is supported on a carrier.

5. The process of claim 2, wherein the transition metal is selected from the group consisting of cobalt, titanium, chromium and iron.

6. The process of claim 3, wherein the metal from group VIII is selected from the group consisting of nickel, palladium and platinum.

7. The process of claim 4, wherein the carrier is selected from the group consisting of alumina, silica, silica-alumina, magnesia, pumice, asbestos and clay.

8. The process of claim 1, wherein the conversion is 70-98% in the first step.

9. The process of claim 1, wherein the unsaturated compound is used in the first step as a solution in a solvent.

10. The process of claim 1, wherein the second step is carried out in a two-bed finishing reaction zone comprising an upper bed of adsorbent and a lower bed of heterogeneous catalyst, the unsaturated compound flowing downwardly.

11. A process as defined by claim 1, wherein said olefinic hydrocarbon is cyclic, said homogeneous hydrogenation catalyst is LiAlH(OR)$_3$, R being tert.-butyl, and cobalt naphthenate dissolved in an inert organic solvent, and the heterogeneous catalyst is nickel on silica.

12. A process as defined in claim 11, wherein the first step is conducted at 180° C. and 40 atmospheres and the second step is conducted at 160° C. and 40 atmospheres.

References Cited
UNITED STATES PATENTS

| | | | |
|---|---|---|---|
| 3,110,747 | 11/1963 | Mullineaux | 260—668 R |
| 3,130,237 | 4/1964 | Wald | 260—668 R |
| 3,366,646 | 1/1968 | Dewhirst | 260—666 P |
| 3,454,644 | 7/1969 | Dewhirst | 260—666 P |

DELBERT E. GANTZ, Primary Examiner

V. O'KEEFE, Assistant Examiner

PO-1050
(5/69)

UNITED STATES PATENT OFFICE
CERTIFICATE OF CORRECTION

Patent No. 3,655,799      Dated April 11, 1972

Inventor(s) Christian Lassau and Lucien Sajus

It is certified that error appears in the above-identified patent and that said Letters Patent are hereby corrected as shown below:

COLUMN 4, CLAIM 1, LINE 35: "hydrogen"

should be "hydrogenation".

Signed and sealed this 15th day of May 1973.

(SEAL)
Attest:

EDWARD M. FLETCHER, JR.
Attesting Officer

ROBERT GOTTSCHALK
Commissioner of Patents